United States Patent [19]

Hoogendonk et al.

[11] 4,398,936

[45] Aug. 16, 1983

[54] PROCESS FOR THE PREPARATION OF A GRANULAR NPK FERTILIZER AND GRANULAR NPK FERTILIZERS OBTAINED BY THIS PROCESS

[75] Inventors: Johan W. Hoogendonk, Geleen; Servatius J. Lucassen, Schimmert, both of Netherlands

[73] Assignee: Unie van Kunstmestfabrieken, B.V., Utrecht, Netherlands

[21] Appl. No.: 213,502

[22] Filed: Dec. 5, 1980

Related U.S. Application Data

[63] Continuation of Ser. No. 53,851, Jul. 2, 1979, abandoned.

[30] Foreign Application Priority Data

Jul. 4, 1978 [NL] Netherlands ................ 7807219

[51] Int. Cl.$^3$ ............. C05B 19/00; C05C 1/02; C05D 1/02
[52] U.S. Cl. ............................ 71/36; 71/51; 71/53; 71/64.06; 71/64.13
[58] Field of Search .............. 71/35, 36, 505, 51, 53, 71/64.03, 64.04, 64.06, 64.12, 64.13, 57–59

[56] References Cited

U.S. PATENT DOCUMENTS

| | | | |
|---|---|---|---|
| 3,002,831 | 10/1961 | Gross et al. | 71/64.03 |
| 3,032,408 | 5/1962 | Baumann | 71/64.03 |
| 3,301,658 | 1/1967 | Arthur et al. | 71/50 |
| 3,384,471 | 5/1968 | Monks et al. | 71/64.03 |
| 3,617,237 | 11/1971 | Nagasawa et al. | 71/64.03 |

FOREIGN PATENT DOCUMENTS

| | | | |
|---|---|---|---|
| 7405235 | 10/1974 | Netherlands | 71/64.03 |
| 485099 | 12/1975 | U.S.S.R. | 71/35 |

OTHER PUBLICATIONS

Sauchelli, Man. on Fert. Manuf., 1973, Industry Publ., Inc., Caldwell, N.J., pp. 239, 241, 276.

Margolis et al., Prod. of Complex Fert., 1970, Israel Prog. for Sci. Trans. Ltd., IPST Cat. No. 5760, pp. 32, 33.

*Primary Examiner*—Ferris H. Lander

[57] ABSTRACT

Storage-stable nitrogen-phosphorous-potassium fertilizer granules and prills are made by adding to a molten or aqueous solution mixture of ammonium nitrate and ammonium phosphate, a particulate potassium salt, typically potassium chloride, in which the particles have an average size no greater than 55 microns and less than 1% by weight of the particles are larger than 150 microns. The potassium salt is added without the need for preheating and at a temperature of between 5° and 40° C. to the mixture where it is simultaneously converted. The resulting mixture is granulated or prilled into NPK fertilizer particles.

9 Claims, No Drawings

PROCESS FOR THE PREPARATION OF A GRANULAR NPK FERTILIZER AND GRANULAR NPK FERTILIZERS OBTAINED BY THIS PROCESS

This is a continuation, of application Ser. No. 53,851 filed July 2, 1979 and now abandoned.

BACKGROUND OF THE INVENTION

The present invention relates to a process for the preparation of a granular NPK (nitrogen-phosphorus-potassium) fertilizer, in which a solid potassium salt, such as potassium chloride, is mixed with an ammonium nitrate-containing liquid phase that also contains ammonium phosphate, or to which ammonium phosphate is added as the next step, and the mixture thus obtained is granulated.

Forming the desired NPK granules is relatively convenient, however, the problem attending such a process is the disintegration of the granules during storage, in particular if the temperature at which the product is stored is above 35° C. Disintegration as used herein denotes the phenomenon that during storage continuing chemical reactions and the attendant formation of new crystals cause the granules to exhibit a strong decrease in breaking strength, to start cracking at the surface, and to show serious efflorescence of salts at the granule surface, which results in annoying dust formation and an increase of fine particles. These conditions lead to diminished product value, increased handling costs and unwarrented worker exposure.

The efflorescence in turn gives rise to coalescence of the individual grains causing the so-called caking of the fertilizer. While it is possible to suppress these phenomena either by heating the potassium salt before the addition, or by heating the entire mixture of N compound, P compound and K compound and thoroughly mixing it before granulation, still in all these measures require a rather considerable consumption of energy, and further comparatively large processing equipment is needed owing to the longer mixing time.

The object of the present invention is to provide a simple, economical and direct process for the preparation of stable granular NPK fertilizers in which the above-mentioned disadvantages are substantially or completely avoided.

DETAILED DESCRIPTION OF THE INVENTION

According to the present invention, these and other objects can be achieved by adding the potassium salt in the form of particles having an average size of at most 55 microns and containing no more than 1% by weight of particles of over 150 microns. The potassium salt particles are added at a temperature of between 5° and 40° C. The average particle size preferably is no greater than 50 microns.

According to this process, granular NPK fertilizers are obtained that exhibit no tendency or at most only minimal tendency towards disintegration during storage. As a consequence, it is not necessary then to preheat the potassium salt or to use a separate mixer in which the mixture is retained for a given period of time to allow for proper conversion of the potassium salt.

The potassium salt can be mixed into the NP melt at the start of the granulation simply by co-feeding the NP melt and potassium salt to the granulator. The mixture may be processed into granules by granulation, e.g., by means of a granulating screw. The potassium salt can then be added to the NP melt shortly before this melt is fed into the screw or it may be fed directly into the screw.

The mixture may also be prilled. In the case of prilling, the potassium salt may be added in the prilling head or in the pipeline that conveys the NP melt to the prilling head.

The potassium salt need not be preheated and is added at a temperature of between 5° C. and 40° C. We have found that at lower temperatures the effect of the process according to the present invention becomes less, and while higher temperatures are certainly acceptable to achieve such temperatures, it requires a separate heating stage and offer no additional advantage. Indeed, it is specifically an object of this invention to avoid preheating and the associated energy expenditure. At a potassium salt temperature of between 10° and 25° C., i.e., normal ambient temperature under customary operating conditions, very satisfactory results are obtained with the process according to the present invention.

The potassium salts that may be used with this process include inter alia potassium chloride and potassium sulfate. The invention particularly is of interest when using potassium chloride, as it is with potassium chloride that the above-mentioned disintegration phenomena will be the most pronounced.

Potassium chloride of the desired particle size can be obtained in any known manner by grinding coarse KCl. It is not necessary to use pure KCl as a starting material. Technical grade KCl, which contains small amounts of NaCl and/or $MgCl_2$, is fully acceptable. Also KCl covered with a small amount of an organic coating agent, for instance an amine, may be used without previous purification. Such organic coating agents are well known in the art.

The process according to the present invention is suitable for the preparation of NPK fertilizers of various compositions, such as, e.g., 17-17-17, 15-15-15, 20-10-10, 15-5-5, etc. Fertilizer compositions, proportions of ingredients and the like are described in Kirk and Othmer, Encyclopedia of Chemical Technology, Vol. 9, pp. 25-150, the disclosure of which is hereby incorporated by reference to the extent necessary to further explain the background of the present invention.

The potassium salt can be added to an ammonium nitrate melt or an ammonium nitrate solution, after which the ammonium phosphate is added in solid or liquid form. Another approach is to first form a liquid mixture of ammonium nitrate and ammonium phosphate after which the potassium salt is added to the mixture thus prepared.

Such a liquid mixture of ammonium nitrate and ammonium phosphate may be prepared in any known way, for example, by ammoniating a mixture of nitric acid and phosphoric acid, or by adding ammonium nitrate to phosphoric acid followed by ammoniation, or it may have been obtained by the so-called nitrophosphate process. This mixture may contain up to 10% by weight of water calculated on the total weight, and in most cases will contain 4-5% of water.

Part of the ammonium nitrate may have been replaced by other ammonium salts, e.g., ammonium sulfate, or it may be used as double salt, e.g., ammonium nitrate sulfate. Part of the ammonium phosphate may also have been replaced by other fertilizers, e.g., alkali and/or alkali-earth phosphates, or be used in the form of double salts, e.g., ammonium phosphate sulfate. The ammonium phosphate is preferably present as orthophosphate, but, if so desired, all or part of it may be present as metaphosphate or polyphosphate. The molten mixture may furthermore contain other fertilizer salts that are compatible with the system, e.g., calcium nitrate, magnesium salts, and the like. Thus, the NPK compositions of the invention are produced from known starting materials and mixtures of materials subject to substantial adjustments in the product mix so long as the critical operational requirements of potassium salt product size and temperatures of addition are observed.

The invention will be further described with reference to the following non-limiting Examples. All parts and percentages are by weight unless otherwise indicated. Examples 3 and 5 are according to the invention, the remaining Examples are for purposes of comparison.

EXAMPLE 1

Granular KCl having an average particle size of 110 microns and preheated to 115° C. was mixed in a mixing vessel with a liquid mixture of ammonium nitrate and ammonium phosphate having a N:$P_2O_5$ ratio of 1:1, a temperature of 160° C. and a moisture content of 4.5% by weight. The resulting mixture, which had a viscosity of 100–150 cP, was thoroughly mixed for about 25 seconds and thereafter granulated in a granulating screw. The amount of KCl was selected to produce a product with a N:$P_2O_5$:$K_2O$ ratio of 17:17:17.

Since it has been found that a decrease of the storage stability of the NPK fertilizer granules is largely due to insufficient conversion of KCl and $NH_4NO_3$, such that the granule still contains free KCl, samples were drawn from the reaction mixture in the mixing vessel and the degree of conversion of the KCl in these samples was determined by X-ray analysis. It was found that about 90% of the KCl had been converted after a mixing period of 25 seconds.

The product obtained from the granulating screw showed hardly any disintegration phenomena upon storage for more than 6 months. It was found that the breaking strength of the product was virtually unchanged (55–60 kg/cm$^2$) over the six month period of time, while the amount of small particles formed and also the amount of caked granules were negligibly small. The granules showed no efflorescence at the surface.

EXAMPLE 2

In the same manner as in Example 1, KCl ground to an average particle size of 60 microns and preheated to 85° C. was mixed with a similar NP melt and granulated in a granulating screw after a mixing period of 5 seconds.

It was determined by X-ray analysis for this particular mixture that about 90% of the KCl had been converted after a mixing time of 5 seconds. This granular product, too, showed no disintegration phenomena upon storage for over 6 months.

EXAMPLE 3

In the same manner as in Example 1, KCl having an average particle size of 50 microns, with the content of particles of over 150 microns of less than 1% by weight and at a temperature of 20°–25° C. was then mixed according to the invention without preheating with NP melt of the same composition as Example 1. The product was subsequently granulated.

It was determined by X-ray analysis that over 90% of the KCl had been converted almost immediately after addition of the KCl to the mixing vessel. The resulting granular product showed no disintegration phenomena upon storage for over 6 months. The original breaking strength (55–60 kg/cm$^2$) was found to be unchanged and the amount of fine particles formed was negligibly small. No caking had occurred and the product did not cause dust formation when bagged.

EXAMPLE 4

In the same manner as in Example 1, KCl with an average particle size of 110 microns was mixed with the NP melt without preheating. X-ray analysis indicated that only 70% by weight of the KCl had been converted after a mixing time of as long as 30 seconds. The mixture was then granulated in a granulating screw.

The granular product showed phenomena of very strong disintegration after a relatively short storage period of several weeks. The amount of caked granules was determined to be 40% by weight, while annoying dust formation occurred when the product was bagged. The breaking strength of the granules after storage dropped to below 35 kg/cm$^2$.

EXAMPLE 5

A liquid mixture of ammonium nitrate and ammonium phosphate having a N:$P_2O_5$ ratio of 1:1, a temperature of 160° C. and a moisture content of 4.5% by weight was fed into a granulating screw. KCl with an average particle size of 50 microns and with less than 1% by weight of particles of over 150 microns was fed directly to the granulating screw as well. The KCl was not preheated but was added at ambient temperature of about 20°–25° C. It was determined by X-ray analysis that over 90% by weight of the KCl in the granulated product had been converted after.

The product showed no disintegration phenomena upon storage for more than 6 months. The breaking strength was found to be virtually unchanged (55–60 kg/cm$^2$), while there were hardly no small particles that had formed and no particles at all had caked together. The product showed no efflorescence at the surface and did not cause any dust formation when bagged.

EXAMPLE 6

In the same manner as in Example 5, a granular fertilizer was prepared by feeding non-preheated KCl of an average particle size of 110 microns directly to the granulating screw.

X-ray analysis showed that only 70% of the KCl in the granulated product had been converted.

After 6 weeks of storage the product had caked to such an extent that bagging was virtually impossible. The product furthermore gave rise to annoying dust formation.

The results of the above experiments are summarized in the following Table:

TABLE

| Example | Particle Size (Microns) | Mixing Time (sec.) | Temperature of KCl Added (°C.) | Breaking Strength (kg/cm) | Product Quality On Storage |
| --- | --- | --- | --- | --- | --- |
| 1 | 110 | 25 | 115 | 55–60 | Acceptable |
| 2 | 60 | 5 | 85 | 55–60 | Acceptable |
| 3* | 50 | — | 20–25 | 55–60 | Acceptable |
| 4 | 110 | 30 | 20–25 | <35 | Unacceptable |
| 5* | 50 | — | 20–25 | 55–60 | Acceptable |
| 6 | 110 | — | 20–25 | <35 | Unacceptable |

*According to the present invention.

As will be seen from Examples 1 and 2, even when KCl particles of a large size are added (110 and 60 microns, respectively) products having good storage ability and maintaining their breaking strength were obtained provided the KCl was preheated. However, in Examples 3–6, where no preheating was used, only particle sizes KCl in accordance with the present invention gave an acceptable product as judged from dust formation, caking and maintaining a commercially acceptable degree of breaking strength.

What is claimed is:

1. In a process for the preparation of granules of NPK fertilizer comprising adding a solid potassium salt to a liquid melt or aqueous solution containing ammonium nitrate and ammonium phosphate and granulating the resulting mixture, the improvement comprising adding said potassium salt to said liquid melt or aqueous solution in the form of particles having a temperature in the range of between 5° C. and 40° C. and an average particle size of at most 55 microns with at most 1 percent by weight of particles over 150 microns, whereupon said resulting mixture is granulated, thereby forming storage-stable granules of NPK fertilizer.

2. The process according to claim 1 wherein the potassium salt has an average particle size of at most 50 microns.

3. The process according to claims 1 or 2 wherein the potassium salt is added to said mixture without preheating and at a temperature of about 10° to about 25° C.

4. The process according to claim 1 wherein the potassium salt is fed to a granulating screw to which also a liquid mixture of ammonium nitrate and ammonium phosphate is fed.

5. The process according to claims 1 or 2 wherein the potassium salt is potassium chloride.

6. In a process for the preparation of granules of NPK fertilizer comprising adding solid potassium salt to a liquid melt or aqueous solution containing ammonium nitrate and thereafter adding ammonium phosphate, and granulating the resulting mixture, the improvement comprising adding said potassium salt to said liquid melt or aqueous solution in the form of particles having a temperature in the range of between 5° C. and 40° C. and an average particle size of at most 55 microns with at most 1 percent by weight of particles over 150 microns, whereupon said resulting mixture is granulated, thereby forming storage-stable granules of NPK fertilizer.

7. The process according to claim 6 wherein the potassium salt has an average particle size of at most 50 microns.

8. The process according to claims 6 or 7, wherein the potassium salt particles are added without preheating and at a temperature of between 10° and 25° C.

9. The process according to claims 6 or 7, wherein the potassium salt is potassium chloride.

* * * * *